(12) United States Patent
Keenan et al.

(10) Patent No.: US 6,788,934 B2
(45) Date of Patent: **\*Sep. 7, 2004**

(54) TEST SYSTEM FOR REMOTELY TESTING SWITCHES WITHIN A TELECOMMUNICATIONS NETWORK

(75) Inventors: Timothy Lee Keenan, Frederick, MD (US); David E. Adams, Gaithersburg, MD (US)

(73) Assignee: Casabyte, Inc., Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/364,152

(22) Filed: Feb. 11, 2003

(65) Prior Publication Data

US 2003/0119497 A1 Jun. 26, 2003

Related U.S. Application Data

(63) Continuation of application No. 09/799,448, filed on Mar. 5, 2001, now Pat. No. 6,542,738, which is a continuation of application No. 09/146,606, filed on Sep. 3, 1998, now Pat. No. 6,230,006.
(60) Provisional application No. 60/058,126, filed on Sep. 8, 1997.

(51) Int. Cl.[7] ................................................. H04Q 7/34
(52) U.S. Cl. ................. 455/424; 455/67.11; 379/27.01; 370/244
(58) Field of Search ................................ 455/424, 423, 455/67.11, 67.14; 374/15.01, 16, 27.01–27.03, 22.01, 26.01–26.02, 29.01; 370/241, 244–245, 249–250

(56) References Cited

U.S. PATENT DOCUMENTS

| | | | |
|---|---|---|---|
| 5,481,588 A | 1/1996 | Rickli et al. | 379/32 |
| 5,490,204 A | 2/1996 | Gulledge | 379/59 |
| 5,615,225 A | 3/1997 | Foster et al. | 379/29 |
| 5,706,333 A | 1/1998 | Grenning et al. | 379/59 |
| 5,768,689 A | 6/1998 | Borg | 455/67.4 |
| 5,835,564 A | 11/1998 | Chang et al. | 379/1 |

(List continued on next page.)

FOREIGN PATENT DOCUMENTS

| WO | WO 98/58509 | 12/1998 |
|---|---|---|
| WO | WO 99/25140 | 5/1999 |
| WO | WO 99/27721 | 6/1999 |

OTHER PUBLICATIONS

"What is a Type–56 Responder/Type–105 Test Line?" Sage Instruments, Freedom, CA.
"356EC Cellular Responder," Sage Instruments, Freedom, CA, 1991.
"356 TMK Cellular Responder," Sage Instruments, Freedom, CA, 1991.
"Specifications: 930A Communications Test Set," Sage Instruments, Freedom, CA, 1990.
"CellSTAR Automated Transmission Test System," Sage Instruments, Freedom, CA.

(List continued on next page.)

*Primary Examiner*—Lee Nguyen
(74) *Attorney, Agent, or Firm*—Seed IP Law Group PLLC

(57) ABSTRACT

A system for centrally and remotely testing switches of cellular and conventional telecommunications network wherein a controller located at a remote location provides instructions to Remote Call Processor (RCP) to thereby prompt the RCPs to establish a communication link from the RCP through a switch to a destination device whereby audio from said destination device is communicated, by way of the switch and the RCP, to the controller in order to verify that the switch properly routed and billed of the call. The destination device may be a service provided by such network or it may be another RCP.

26 Claims, 8 Drawing Sheets

U.S. PATENT DOCUMENTS

| | | | | |
|---|---|---|---|---|
| 5,875,398 | A | * 2/1999 | Snapp | 455/424 |
| 5,903,633 | A | 5/1999 | Lorsch | 379/114.2 |
| 5,930,707 | A | 7/1999 | Vambaris et al. | 455/424 |
| 5,931,907 | A | 8/1999 | Davies et al. | 709/218 |
| 5,933,776 | A | 8/1999 | Kirkpatrick | 455/423 |
| 5,987,306 | A | 11/1999 | Nilsen et al. | 455/67.1 |
| 6,055,425 | A | 4/2000 | Sinivaara | 455/431 |
| 6,118,982 | A | 9/2000 | Ghisler et al. | 455/67.4 |
| 6,230,002 | B1 | 5/2001 | Flodén et al. | 455/411 |
| 6,230,006 | B1 | 5/2001 | Keenan et al. | 455/424 |
| 6,233,448 | B1 | 5/2001 | Alperovich et al. | 455/417 |
| 6,234,810 | B1 | 5/2001 | Schnell et al. | 439/76.1 |
| 6,234,844 | B1 | 5/2001 | Somerville et al. | 439/630 |
| 6,236,853 | B1 | 5/2001 | Mee et al. | 455/414 |
| 6,240,301 | B1 | 5/2001 | Phillips | 455/550 |
| 6,244,553 | B1 | 6/2001 | Wang | 248/278.1 |
| 6,244,911 | B1 | 6/2001 | Heim | 439/862 |
| 6,249,276 | B1 | 6/2001 | Ohno | 345/173 |
| 6,253,073 | B1 | 6/2001 | Cooper | 455/411 |
| 6,259,921 | B1 | 7/2001 | Totaro et al. | 455/445 |
| 6,259,929 | B1 | 7/2001 | Kuisma | 455/550 |
| 6,261,128 | B1 | 7/2001 | Heim et al. | 439/630 |
| 6,264,506 | B1 | 7/2001 | Yasufuku et al. | 439/630 |
| 6,266,527 | B1 | 7/2001 | Mintz | 455/423 |
| 6,272,450 | B1 | 8/2001 | Hill et al. | 703/13 |
| 6,278,706 | B1 | 8/2001 | Gibbs et al. | 370/352 |
| 6,278,886 | B1 | 8/2001 | Hwang | 455/566 |
| 6,282,182 | B1 | 8/2001 | Pecen et al. | 370/336 |
| 6,282,491 | B1 | 8/2001 | Bochmann et al. | 701/209 |
| 6,283,376 | B1 | 9/2001 | Schuder et al. | 235/486 |
| 6,285,869 | B1 | 9/2001 | Shannon et al. | 455/411 |
| 6,292,666 | B1 | 9/2001 | Siddiqui et al. | 455/456 |
| 6,292,668 | B1 | 9/2001 | Alanara et al. | 455/466 |
| 6,295,454 | B1 | 9/2001 | Havinis et al. | 455/456 |
| 6,298,247 | B1 | 10/2001 | Alperovich et al. | 455/558 |
| 6,301,475 | B1 | 10/2001 | Saarela et al. | 455/426 |
| 6,305,960 | B1 | 10/2001 | Fan | 439/188 |
| 6,307,934 | B1 | 10/2001 | Möster et al. | 379/438 |
| 6,308,069 | B1 | 10/2001 | Freitag et al. | 455/435 |
| 6,308,070 | B1 | 10/2001 | Laster | 455/445 |
| 6,308,317 | B1 | 10/2001 | Wilkinson et al. | 717/5 |
| 6,311,054 | B1 | 10/2001 | Korpela | 455/406 |
| 6,311,055 | B1 | 10/2001 | Boltz | 455/414 |
| 6,314,290 | B1 | 11/2001 | Joshi et al. | 455/427 |
| 6,320,751 | B2 | 11/2001 | Takeda et al. | 361/737 |
| 6,320,873 | B1 | 11/2001 | Nevo et al. | 370/466 |
| 6,321,079 | B1 | 11/2001 | Cooper | 455/411 |
| 6,321,084 | B1 | 11/2001 | Horrer | 455/431 |
| 6,324,402 | B1 | 11/2001 | Waugh et al. | 455/445 |
| 6,324,412 | B1 | 11/2001 | Alen et al. | 455/567 |
| 6,326,543 | B1 | 12/2001 | Lamp et al. | 174/52.1 |
| 6,327,153 | B2 | 12/2001 | Rauhala et al. | 361/737 |
| 6,332,579 | B1 | 12/2001 | Ritter | 235/492 |
| 6,334,052 | B1 | 12/2001 | Nordstrand | 455/411 |
| 6,341,069 | B1 | 1/2002 | Torlotin | 361/737 |
| 6,341,220 | B1 | 1/2002 | Hurme | 455/410 |
| 6,341,228 | B1 | 1/2002 | Hubbe et al. | 455/566 |
| 6,343,945 | B1 | 2/2002 | Liikanen | 439/160 |
| 6,349,204 | B1 | 2/2002 | Goetz et al. | 455/419 |
| 6,353,737 | B1 | 3/2002 | Herzog | 455/418 |
| 6,375,073 | B1 | 4/2002 | Aebi et al. | 235/379 |
| 6,384,789 | B2 | 5/2002 | Hofmann | 343/702 |
| 6,385,300 | B1 | 5/2002 | Mohammadian et al. | 379/21 |
| 6,430,410 | B1 | 8/2002 | Staber | 455/423 |
| 6,456,859 | B1 | 9/2002 | Desblancs et al. | 455/558 |
| 6,542,738 | B2 | 4/2003 | Keenan et al. | 455/424 |

OTHER PUBLICATIONS

"CellSTAR," Sage Instruments, Freedom, CA, 1992.

"CellSTAR System Worksheet," Sage Instruments, Freedom, CA, 1992.

"Revenue Assurance Products," *Network Performance Improvement Products*, Comarco Wireless Technologies, http://www.comarco.com/html/revenue_assurance_series.htm, accessed Aug. 10, 1998.

"Automated Remote Origination Network Test System," IC Engineering, Inc., Owings Mills, MD, Nov., 1991.

"Model RTS–1 Remote Access/Loopback Terminal Set Instructions," Metro Tel, Practise 56–0018, Issue 2, Sep. 1991.

Huffman, M., "Cut Travel Time For Translations," *Telephone Employees & Management*, pp. 72–73, Mar. 1, 1992.

"TMS Product Catalog," Metro Tel, Hicksville, NY, Sep. 1991.

"Remote Test Set: Instruction Manual—Model RTS–1," Metro Tel Corp., Hicksville, NY.

"ARONTS Presentation Outline," Metro Tel Sales Presentation, 1991.

"Remote Loopback Test Set Model RTS–1," Metro Tel Corp., Hicksville, NY, Apr. 1988.

"Remote Access & Test Set Model RTS–1," Metro Tel Corp., Jericho, NY, 1992.

"Telephone Network Test System," Metro Tel Corp., Hicksville, NY.

U.S. patent application No. 10/194,937, filed Jul. 11, 2002.
U.S. patent application No. 10/194,417, filed Jul. 11, 2002.
U.S. patent application No. 10/194,938, filed Jul. 11, 2002.
U.S. patent application No. 10/194,450, filed Jul. 11, 2002.
U.S. patent application No. 10/194,430, filed Jul. 11, 2002.
U.S. patent application No. 10/194,440, filed Jul. 11, 2002.

* cited by examiner

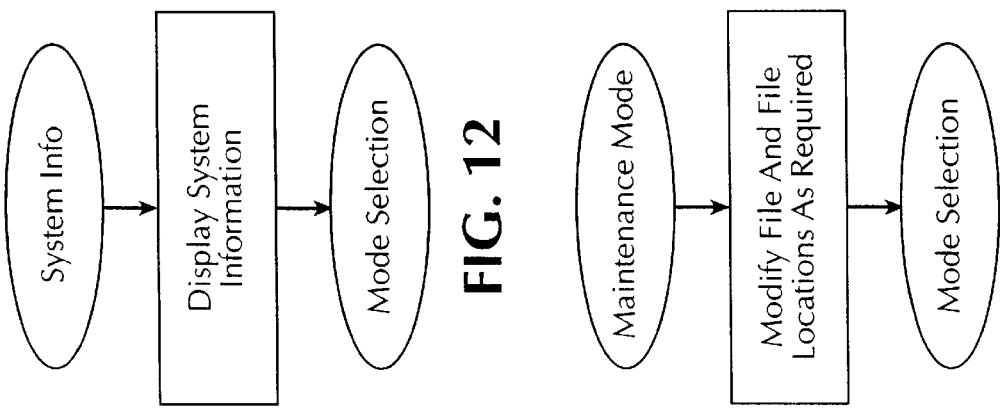
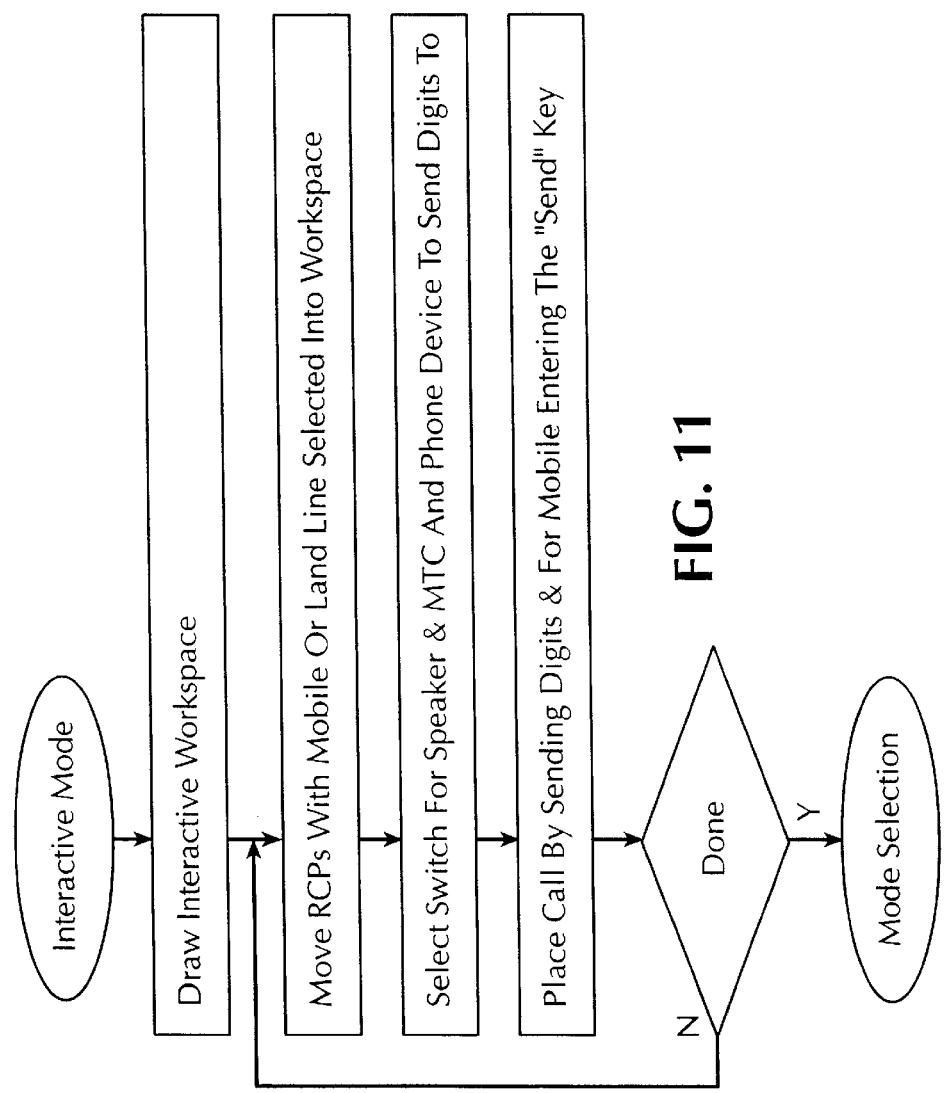

TEST SYSTEM FOR REMOTELY TESTING SWITCHES WITHIN A TELECOMMUNICATIONS NETWORK

CROSS REFERENCE TO RELATED APPLICATIONS

This is a continuation of U.S. patent application, Ser. No. 09/799,448, filed Mar. 5, 2001, now U.S. Pat. No. 6,542,738 which is a continuation of U.S. patent application Ser. No. 09/146,606, filed Sep. 3, 1998, now U.S. Pat. No. 6,230,006, which claims priority to a U.S. provisional application Serial No. 60/058,126, filed Sep. 8, 1997, all of which are incorporated herein by reference.

FIELD OF THE INVENTION

This invention relates generally to a system for testing the operation of a telecommunications network and more specifically to a system for remotely testing one or more switches within a telecommunications network.

BACKGROUND OF THE INVENTION

Telecommunications networks can generally be divided into two components, cellular networks and conventional land-line networks. While the cellular networks support wireless telephone services and the land-line networks support conventional telephone service, the networks and services generally overlap in that a user of a wireless telephone service can place a phone call through the cellular network to the land-line network to thereby establish a telephone link with a conventional telephone, and conversely, a user of a conventional telephone service can place a phone call through the land-line network to the cellular network to thereby establish a phone link with a wireless telephone. Furthermore, in some instances, the cellular network is comprised of communication links that may, at times, be considered part of the land-line network.

There are many cellular networks in place around the United States and the rest of the world. Generally, a cellular network is bounded by a geographic territory. For example, the AT&T cellular network generally services the entire continental United States while the Cellular One cellular network generally services the east coast of the United States. A cellular network is generally comprised of multiple service areas, each of which is subdivided into multiple cells. Each cell has a base station for receiving and transmitting phone calls between a mobile phone and the cell, and the base stations are connected to a switch normally located in a mobile telephone switching office (MTSO). The number of switches required for a service area varies depending on the volume of calls experienced in the service area. Some service areas have only one switch to which all the base stations within the service area are connected; some have multiple switches such that the base stations within the service area are divided between the switches; and some even share a switch with other service areas. The MTSO generally manages the multiple switches in the cellular network and maintains a communications link between the cellular network and the land-line network.

Functionally, when a call is placed by a wireless phone located within a given cell of a service area in the cellular network, the cell base station receives the phone call and forwards it to the service area switch where it is forwarded to the destination device. If the destination device is another wireless phone located in another service area of the same cellular network, the service area switch forwards the phone call to the switch of the destination service area where it is forwarded to the bases station of the destination cell for transmission to the destination wireless phone, thereby establishing a communication link between two wireless phones within the same cellular network. If the destination device is a conventional phone, the MTSO directs the call from the calling service area switch to a switch associated with the land-line network where the call is connected to the conventional phone. If the destination device is a wireless phone located in a different cellular network, the calling service area switch forwards the phone call through the land-line network to the destination cellular network where it is directed through the switch of destination service area to the base station of the destination cell for transmission to the destination phone, thereby establishing a communication link from the calling wireless phone to the destination wireless phone by way of the calling cellular network, the land-line network and the destination cellular network.

One of skill in the art will understand that a phone call initiated by a wireless phone may involve many different switches in many different networks. Generally, the first switch accessed by the caller is the "billing switch" responsible for tracking and recording all the various charges associated with the phone call, including enhanced services. Such charges might include basic charges, in-network roaming charges, out-of-network roaming charges, land-line fees, long distance fees or other cellular network fees as will be appreciated by one of skill in the art. A billing switch that improperly tracks fees associated with a phone call or with any enhanced services provided by the service provider, results in lost revenue to, or over billing by, the service provider. Therefore, it is critical to the service provider that the billing switches consistently and accurately track and record fees.

Generally, a user of a cellular phone will execute a subscription agreement with one or more service providers which allows the user to place calls within the service providers cellular network. The user generally enters subscription agreements with service providers having cellular networks covering the geographic area in which the user normally makes phone calls. For purposes of this description, the service providers with which the user has a subscription agreement will be referred to as "home" service providers. The various service providers have executed agreements whereby a subscriber to a service provider can use the services of other service providers, subject to a fee, and the "home" service provider will appropriately charge the subscriber.

Every wireless phone contains an Electronic Serial Number (ESN) and a Numbered Assignment Modules (NAMs) which together indicate the "home" service providers to which the phone is associated (hereafter the ESN and the NAM will be collectively referred to as the "NAM"). When a wireless phone establishes a phone call, the associated billing switch recognizes the NAM in order to determine whether the phone is communicating with a "home" or "non-home" service provider in order to properly track and allocate fees. Initiating a call within the network of a "home" service provider will be charged differently than initiating a call within the network of a "non-home" service provider. Furthermore, calls initiated within "non-home" service providers will be charged differently depending upon the specific agreement between the non-home service provider and the home service provider.

Each billing switch tracks and records the fees associated with a phone call through use of a "billing table" that is preprogrammed into the switch by the service provider. The billing table recognizes charges associated with each call including any charges for enhanced services (i.e. call waiting) subscribed to by a user. Generally, the switches will be reprogrammed with updated billing tables at various times including whenever a new service area is added or removed from the cellular network; whenever a subscriber is added or deleted from the service provider; whenever the cellular network fees are changed; whenever the agreement between the cellular network and other networks changes. Furthermore, the hardware and or software of a switch may be periodically upgraded (e.g., a base station may be added to the switches' service area or the switch may be reprogrammed with "upgraded" software for bug fixes or feature enhancements). In addition, the switch undergoes maintenance or routing changes that change or effect the interaction between the switches. The upgrades and maintenance sometimes result in errors associated with billing and network operations causing the switch to malfunction as it processes calls. Whenever the switch is reprogrammed, upgraded, or undergoes maintenance, it is critical that the service provider have an efficient means for verifying that the various switches function properly and correctly track and record fees.

When a call is placed, the numerous switches handling the call are responsible for properly routing and billing the call. A switch that is installed, reprogrammed, upgraded, or maintained improperly may result in improperly routed and/or billed calls and thus lost revenue to the service provider. Because switches are being installed in new networks and because switches in existing networks are continuously reprogrammed, upgraded and/or maintained, a system for testing the proper operation of the numerous switches within a telecommunications network, and thus the proper routing and billing of calls to and from such network, is necessary to maintain an efficient network. Presently, there are two such types of systems available to service providers, one made by Rotodata and the other made by Comarco.

The Comarco system includes a testing device that places a wireless call to a service area of a cellular network where such call is routed through the switch associated with the service area to a destination device whereby a communication link is established between the testing device and the destination device. The destination device may be a mobile or land-line phone offering a pre-recorded audio message that is communicated over the established communications link to the user of the testing device where proper operation of the switch may be confirmed. The testing device may also be equipped with multiple phones such that the testing device may establish a communication link from a first one of said phones to a second one of said phones thereby establishing the testing device as the destination device. The testing device must be located "in the field" (e.g., geographically within the service area) so as to be capable of wireless communication with the service area.

One shortfall of the Comarco system is that the testing device is designed to be locally controlled in that setting the parameters of the testing device and/or initiating the test requires a technician to be located "in the field" with the testing device. This limitation also requires that a field technician travel to the various service areas of the cellular network in order to test the numerous switches within the network. Another shortfall of the Comarco System is that the testing device does not have the capability to record audio received from the destination device thereby requiring that a technician be located in the field with the testing device during testing in order for the technician to hear the quality of the audio received at the test device. Yet another shortfall of the Comarco system is that the presence of the technician in the field prevents the technician from accessing the billing records of the call, which are normally located in a central office, and therefore from verifying proper billing simultaneously with the verification of the call. Still yet another shortfall of the Comarco system is that it cannot complete calls from one testing device to a second testing device. A further shortfall of the Comarco system is that it does not enable the user to verify the audio of the placed call in both directions without a technician being present at each end of the call. Yet a further shortfall of the Comarco system is that it cannot interactively control or measure the testing being performed by the testing device.

The Rotodata system includes a testing device that places a wireless call to a service area of a cellular network where such call is routed through the switch associated with the service area to a destination device. Typically, the destination device is a pre-recorded audio message that is communicated to the user of the testing device to confirm proper operation of the switch. Unlike the Comarco system, the Rotodata system has remote control feature that permits operation of multiple testing devices from a remote location.

One shortfall of the Rotodata system is that the remote capability does not permit audio from the testing device to be communicated to the remote control location thereby forcing the user to rely on non-audio information in the call verification process. This limitation prevents the user from remotely verifying whether the audio was received, or the quality of the audio received, at either the testing device or the remote control location and prevents the user from remotely testing services such as 911 emergency service, voice mail, call forwarding, call waiting, no answer transfer and messaging, and any other service that can be verified through an interactive audio process. Accessing the audio requires the user to be in local control of the testing device which requires the technician to be located in the field with the testing device. Another shortfall of the Rotodata system is that the remote capability does not permit audio from the remote control location to be communicated to the testing device or the destination device thereby preventing the user from audio interaction with either of the devices. This limitation also prevents the user from testing services such as voice mail, call forwarding, call waiting, no answer transfer and messaging or any other service that can be verified through an interactive audio process. Yet another shortfall of the Rotodata system is that the remote control is implemented over an unsecured POTS line. Still yet another shortfall of the Rotodata system is that the system does not allow for individual call control of each remote unit. For example, the remote units will accept a 24 hour series of commands to run without master control such that the user will lose 24 hours of test if a test error occurs.

Therefore, an object of the invention is a system for remotely testing a switch of a telecommunications network where audio received at the testing device is communicated to the remote control location whereby the user can verify the proper completion of the call, the audio quality, and the billing records.

Another object of the invention is a system for remotely testing a switch of a telecommunication network where audio from the remote control location is communicated to the testing device.

Yet another object of the invention is a system for remotely testing a switch of a telecommunication network where audio from the remote control location is communicated through the testing device to the destination device.

Still yet another object of the invention is a system for remotely testing a switch of a telecommunications network where such system is capable of centralized remote management of multiple testing devices and centralized remote testing of multiple switches.

A further object of the invention is to provide a system for remotely testing a switch of a telecommunications network where a communication link is established from a first testing device through a switch to a second testing device where the user at a remote control location has access to audio received at the first testing device and the second testing device.

BRIEF DESCRIPTION OF THE DRAWINGS

FIGS. 4–13 are flow diagrams of the present invention.

SUMMARY OF INVENTION

The present invention is a system for centrally and remotely testing switches of cellular and conventional telecommunications network wherein a controller located at a remote location establishes a communication link with a Remote Call Processor (RCP) and provides instructions to the RCP to thereby prompt the RCP to establish a communication link from the RCP through a switch to a destination device whereby audio from said destination device is communicated, by way of the switch and the RCP, to the controller in order to verify that the switch properly routed and billed the call. The destination device may be a service provided by such network or it may be another RCP.

DETAILED DESCRIPTION OF THE INVENTION

Figure 1:
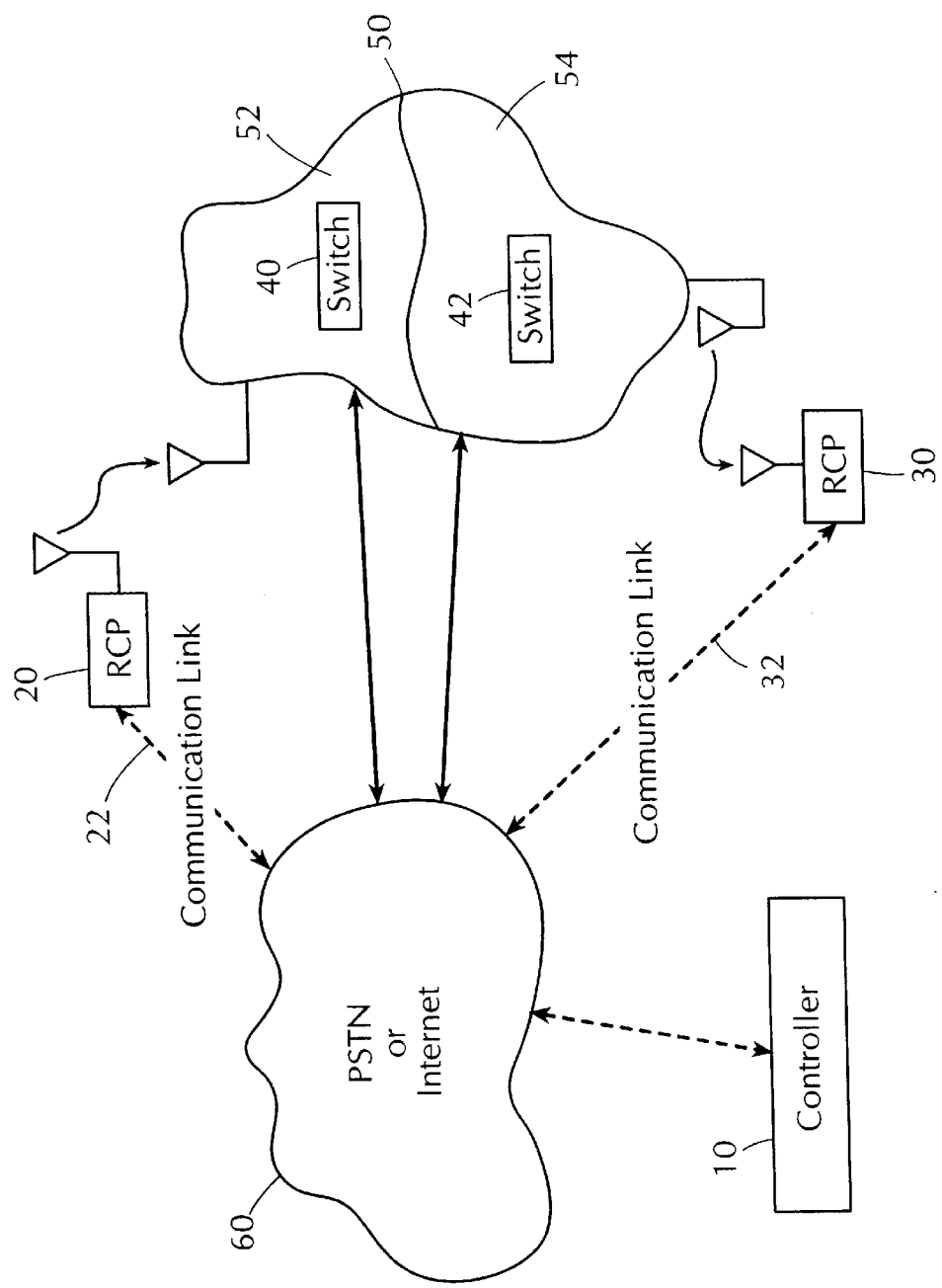
FIG. 1 is an illustration of the system of the present invention.

FIG. 1 is an illustration of one embodiment of the present invention. Referring to FIG. 1, the system of the present invention is a system for testing a switch 40 of a telecommunications network 50. In a preferred embodiment, the telecommunications network 50 is a cellular network comprised of multiple service areas 52 and 54. The system of the present invention includes one or more remote call processors (RCPs) 20, 30 and a controller 10. The RCPs 20, 30 include phone means for establishing a communication link from the RCP 20 through the calling area switch 40 to a destination device such that audio from the destination device is communicated to the RCP 20. The destination device may be a prerecorded voice mail box established by the service provider or, as further described below, another RCP 30, or any other device that assists in the verification of the operation of the switch 40.

The controller 10 is for remotely controlling operation of the RCP 20. The controller includes remote communication means for establishing a communication link between the controller 10 and the RCP 20 such that audio received at the RCP 20 will be communicated to the controller 10. The controller 10 also includes means for instructing the RCP 20 to initiate a phone call to the destination device. Functionally, an operator of the system prompts the controller 10 to establish a communication link between the controller 10 and the RCP 20 and instructs the RCP 20 to initiate a phone call to a selected destination device. In response to such instructions, the RCP 20 initiates a phone call to the destination device and establishes a communication link from the RCP 20 through the calling area switch 40 to the destination device (not shown). In this way, audio from the destination device is communicated through the calling area switch 40 and the RCP 20 to the controller 10. The operator of the system can then evaluate the audio received at the controller 10 to determine if the calling area switch 40 properly connected the RCP 20 to the destination device. The operator may further determine if the calling area switch properly switched the call and billed for the call by reviewing the translation tables and billing records of the switch, which preferably would be accessible at the location of the controller 10.

In one embodiment, the destination device may be a voice mail service, a call waiting service, a call forwarding service, a no answer transfer service, a messaging service, a voice recognition service or any other of the types of services provided in such a network. In such a case, the destination device may prompt the user, through a pre-recorded voice, to select from a number of options through use of the telephone keypad. The pre-recorded voice would be forwarded to the RCP 20, and thus to the controller 10, for a response. The controller includes means for instructing the RCP 20 to respond to such queries. In this way, the operator may verify the proper operation of the switch 40 by verifying that the call was established from the RCP 20 to the correct destination device and that the 2-way audio transmission communicated from the RCP 20 through the switch 40 to the destination device was enabled. It will be appreciated by one of skill in the art that the destination device may be any type of device sufficient to verify that the communication link through switch 40 was properly established. Furthermore, the destination device may be located in another service area, another cellular network or the PSTN, as further described below. In another embodiment of the invention, the destination device may be a second or third wireless phone means located in the RCP 20, whereby upon being prompted by the controller 10, the RCP 20 establishes a communication link from a first phone means located in the RCP 20, through the calling area switch 40, to the second or third phone means located in the RCP 20. In another embodiment of the invention, the destination device may be a conventional phone means located in the RCP 20, whereby upon being prompted by the controller 10, the RCP 20 establishes a communication link from the wireless phone means located in the RCP 20, through the calling area switch 40, to a conventional phone means located in the RCP 20.

In another embodiment of the present invention, and with continued reference to FIG. 1, the destination device is a second RCP 30 that is in wireless communication with either the first service area 52 or a second service area 54 as shown. In this embodiment, the user prompts the controller to establish a communication link with RCP 20 and RCP 30. The controller then instructs the RCP 20 to initiate a phone call to RCP 30 and instructs RCP 30 to expect a phone call. In response to such instructions, the RCP 20 attempts to establish a communication link through calling area switch 40 and calling area switch 42 to RCP 30. If successful, the RCP 30 sends data to the controller indicating the successful completion of the call at which time the user may verify that the call was properly billed by referencing the billing records. If RCP 30 does not receive the call within a predetermined period of time, RCP 30 will send data to the controller indicating that the call has not been received, at which point the user may determine that one or more of the switches 40 and 42 did not properly route the call.

A successful call will establish a communication link, resembling a communication loop, from the controller 10, through RCP 20, calling area switch 40, calling area switch 42, and RCP 30 to the controller 10. As shown in FIG. 1, and as will be appreciated by one of skill in the art, the communication link between the controller 10 and RCPs 20 and 30 may be comprised of the PSTN 60. Also, the communication link between calling area switch 40 and calling area switch 42 may be comprised of leased lines that at other times may be considered part of the PSTN.

In the communication loop established with a successful call, the communication link between RCP 20 and RCP 30 is generally a conventional wireless telephone link capable of passing audio in either direction. The communication links 22 and 32 between the controller 10 and the RCPs 20 and 30, respectively, will be further described below. Generally, however, these communication links may be such that they either pass one-way audio or two-way audio depending upon the specific design chosen. Furthermore, the system may have two modes of operation, a non-audio mode and an audio mode. In the non-audio mode, non-audio control and status information may be passed between the controller and each of the RCPs. In this mode, audio is not used for call verification. Such control and status information may be any type of remote control and status information known in the art. In the non-audio mode, the controller will not receive or communicate audio.

In the audio mode, in addition to control and status information being passed between the controller and each of the RCPs, audio is also passed between the controller 10 and the RCPs 20 and 30. For the embodiment where communication links 22 and 32 are one-way audio, when the system is in the audio mode, audio received at RCP 20 is communicated to the controller over communication link 22 and audio generated at the controller 10 is communicated to RCP 30 over communication link 32. In this mode, audio generated at the controller will be communicated to RCP 30 over communication link 32; audio from RCP 30 will be communicated to RCP 20 through calling area switches 42 and 40; and audio from RCP 20 will be communicated to the controller 10 over communication link 22, thereby creating a one-way audio loop that begins and ends at the controller 10. While in audio mode, the operator can verify that audio is adequately passing from RCP 30 through the calling area switches to RCP 20 by communicating an audio signal from controller 10 over communication link 32 to RCP 30 and verifying that such signal is thereafter received at controller 10 over communication link 22.

In the preferred embodiment, the audio signal would be generated by the operator speaking into a microphone provided with the controller 10, or through a pre-recorded text or speech message which may include a text to speech function as will be appreciated by one of skill in the art, the details of which will be further discussed below, and the audio signal would be received by a speaker provided with the controller 10, thereby enabling the operator to verify the call by simply speaking into a microphone, or initiating the pre-recorded text or speech message, and listening to the speaker. In this embodiment, where the communication links 22 and 32 are such that only one-way audio is permitted, the controller 10 would be provided with an electronic switch controlled by software residing in the Controller 10, for reversing the path of the audio loop. By reversing the switch, audio from RCP 30 is communicated to the controller 10 over communication link 32 and audio from the controller is communicated to RCP 20 over communication link 22. In this embodiment, by reversing the switch, the audio signal generated at the controller 10 would be communicated to RCP 20 over communication link 22 and thereafter received at controller 10 over communication link 32. In this way, the user may quickly verify the proper operation of the switch 40 and the quality of the audio passing between the RCPs.

Communications links 22 and 32 and the means for communicating over such links may be any known means for remotely communicating between two devices over a telecommunications network. In one embodiment, the controller and the RCP 20 or 30 include modems and the communication links 22 and 32 are conventional phone lines or wireless communication links. In another embodiment, the communications links 22 and 32 may be comprised of the Internet and the controller 10 and the RCP 20 or 30 include voice-over-Internet means for communicating audio over the Internet. In the preferred embodiment, communications links 22 and 32 are an internal corporate intranet comprised of an Ethernet communication link where the controller 10 and the RCP 20 or 30 include an Ethernet card for passing data over an Intranet via an Ethernet communication link and include voice-over-Ethernet means for sending audio over the Ethernet Intranet communication link.

Figure 2A:
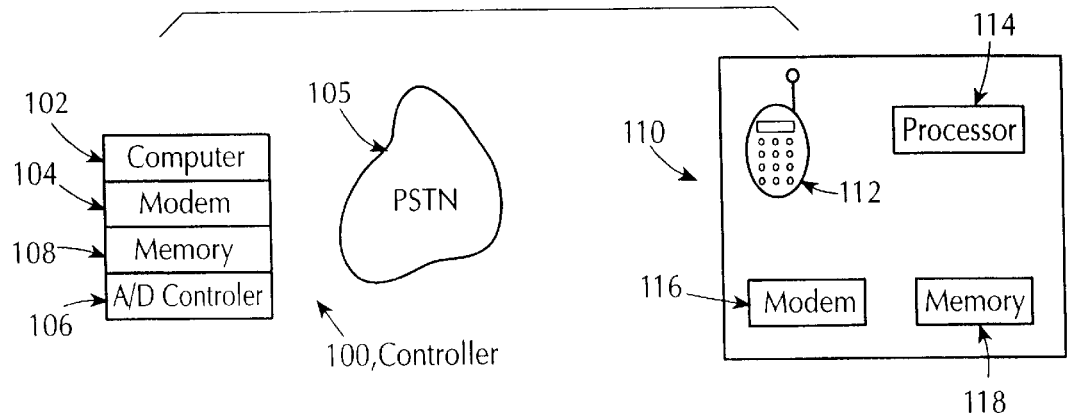
FIG. 2 is a diagram of the controller and the Remote Call Processor of the present invention.

FIG. 2 is a diagram of the various embodiments of the controller and the RCP of the system of the present invention. Referring to FIG. 2a, the controller 100 and the RCP 110 are shown. The controller 100 includes remote communication means for establishing a communication link between the controller 100 and the RCP 110. The remote communication means may be comprised of a conventional computer 102 with a modem 104 for establishing a communication link between the controller 100 and the RCP 110 over a conventional phone line normally associated with the PSTN 105 such that the controller 100 can communicate control instructions to the RCP 110 and such that audio can be passed between the RCP 110 and the controller 100. The modem 104 and the computer 102 may be any computer or modem known to one of skill in the art to enable such communication between the controller 100 and the RCP 110.

The controller 100 includes means for instructing the RCP 110 which essentially comprises the modem 104 and conventional software for generating and sending control instructions to the controller 110. Such software for generating such control instructions may be any conventional or known type of software used for remote communications between devices, which are generally known in the art. In the preferred embodiment, such software is comprised of a combination of Microsoft "visual basic" and Microsoft "C" software that are compiled to run on a standard Pentium based personal computer. Functionally, a user of the system would prompt the controller 100 to instruct the RCP 110 to initiate a call, whereby the controller 100 would establish a communication link with the RCP 110 and communicate control data over the communication link to the RCP 110.

The controller 100 may also include and A/D converter 106 for digitizing the analog voice received at the controller 100, whereafter such digitized voice may be stored in memory 108. Such memory 108 may be any memory known that is sufficient to store digital audio data.

With continued reference to FIG. 2a, the RCP 20 includes a phone means 112, a processor 114, a modem 116, and memory 118. The phone means 112 may be a conventional phone or in the preferred embodiment the phone means would be a conventional cellular phone. The cellular phone may be capable of communicating in one or more of the types of wireless communication systems such as TDMA, CDMA, NMT, AMPS or GSM. The modem 116 enables the communication between the controller 100 and the RCP 110 and may be any type of modem available and generally known by one of skill in the art. In the preferred embodiment the processor 114 is a Pentium based processor, and the memory 118 may be of the type generally known to those skilled in the art that is sufficient to store digital audio data. The modem 116 receives and transmits commands and audio signals between the controller 100 and the processor 114. The processor 114 commands the phone 112 to place and receive calls and interrogates the phone 112 for basic information about the call which may include information related to the network performance of a particular call, and the duration of the call, etc. All information is then processed and sent back to the controller 100 for further interpretation and display to the user.

Figure 2B:
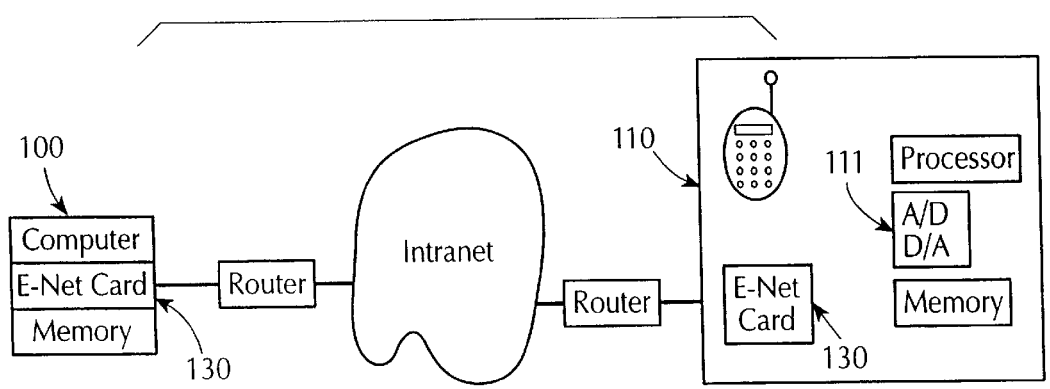

FIG. 2b shows another embodiment of the controller 100 and the RCP 110 of the system of the present invention. In this embodiment, the communication link between the controller 100 and the RCP 110 is that of a private corporate intranet comprised of an Ethernet communication link over the Internet. In this embodiment the controller 100 and the RCP 110 each have an Ethernet Card 130. The RCP 110 further comprises means for digitizing audio received from a destination device. Such means may include an A/D and a D/A converter 111 for digitizing the analog audio received at the RCP 110 from the destination device and for analoging the digital audio received at the RCP 110 from the controller 100, if necessary. In this embodiment audio and control signals passed between the controller 100 and the RCP 110 are in a digital format and the audio received at the RCP 110 is readily stored in the memory 118 of the RCP 110 or the memory of the controller 100.

Figure 2C:
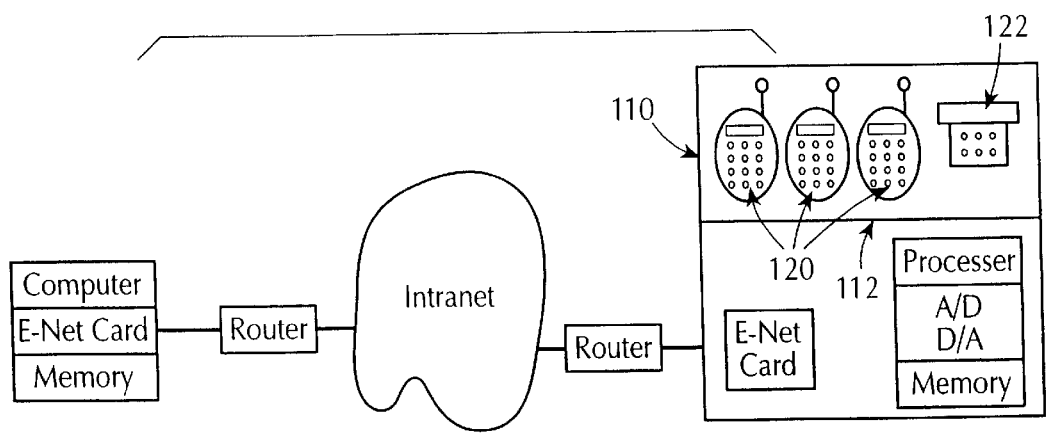

In the preferred embodiment, as shown in FIG. 2c, the phone means 112 located in the RCP 110 comprises three wireless phones 120 and one or more conventional phones 122. In this embodiment, test calls may be placed between phones of different RCPs, as described earlier, or between phones of the same RCP 110. Additionally, calls may be placed by any one of the phones 112 to any other one of the phones. As a single call is place and received within the phone means 112, the audio and control associated with that call will be communicated over the Ethernet medium to the controller 100.

The RCP 110 may also include means for measuring the quality of the audio received at the RCP from the destination device. Such means would include any known means of measuring the signal strength, the signal to noise ratio and the clarity of the audio received.

Figure 3:
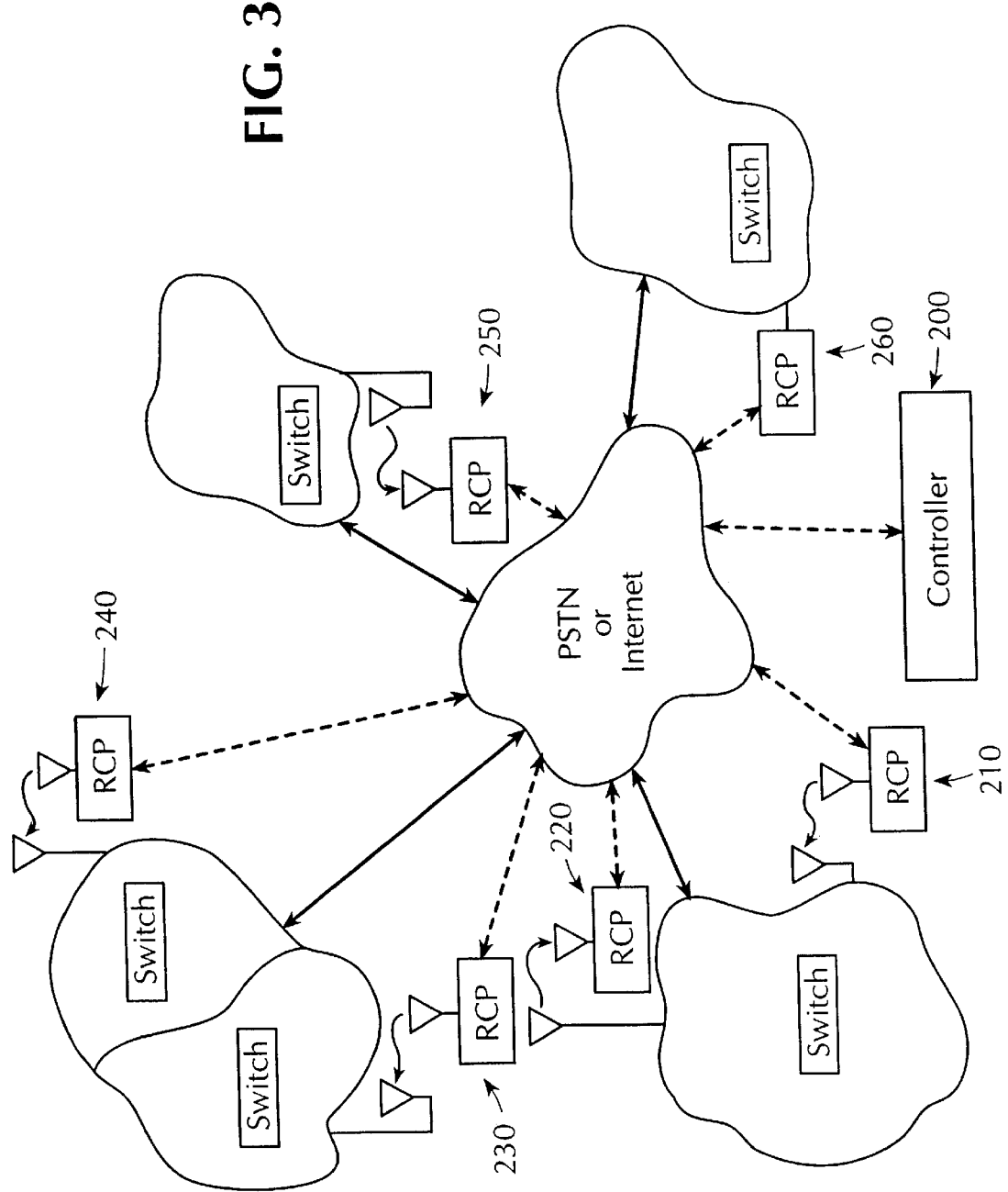
FIG. 3 is a diagram of the system of the present invention.
Figure 6:
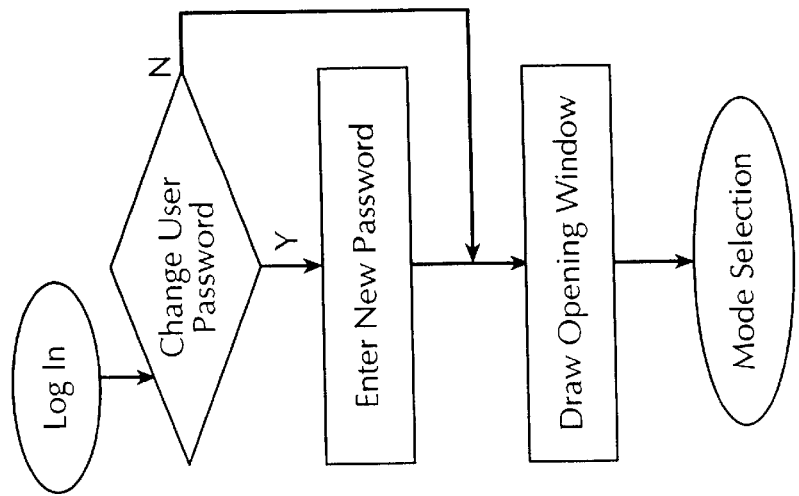
Figure 5:
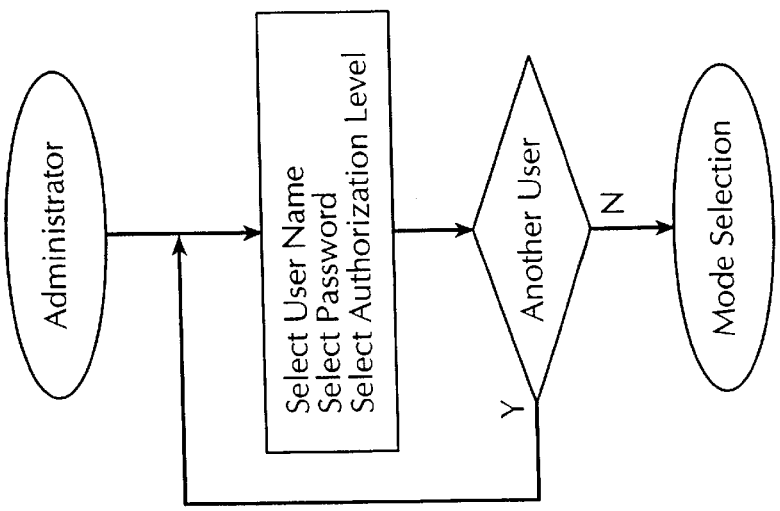

FIG. 3 shows an illustration of the system of the present invention. Referring to FIG. 3, the system of the present invention as applied to various scenarios encountered in a broad network is shown. As shown therein, for broadest testing capability, an RCP is needed for each switch in the network, and in the event that a single switch covers multiple service areas, an RCP is needed for each service area. It will be appreciated by one of skill in the art that the system of the present invention enables testing of switches of multiple networks form a centralized remote location. As shown in FIG. 3, controller 200 provides central control of a broad number of RCPs (210, 220, 230, 240, 250 and 260) thereby enabling fast efficient testing of multiple switches throughout various cellular and land-line networks. Tests may be performed from any RCP to any destination device which includes tests from any RCP to any other RCP. In the preferred embodiment the system will have a script testing feature for testing a test call created by the user in order to ensure that the test call was created properly.

Figure 4:
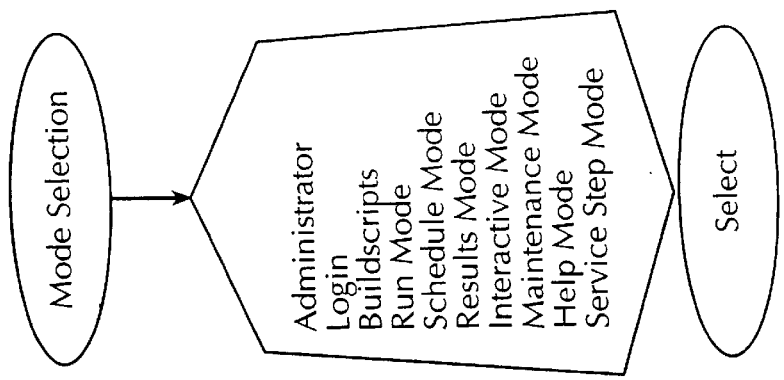
Figure 7:
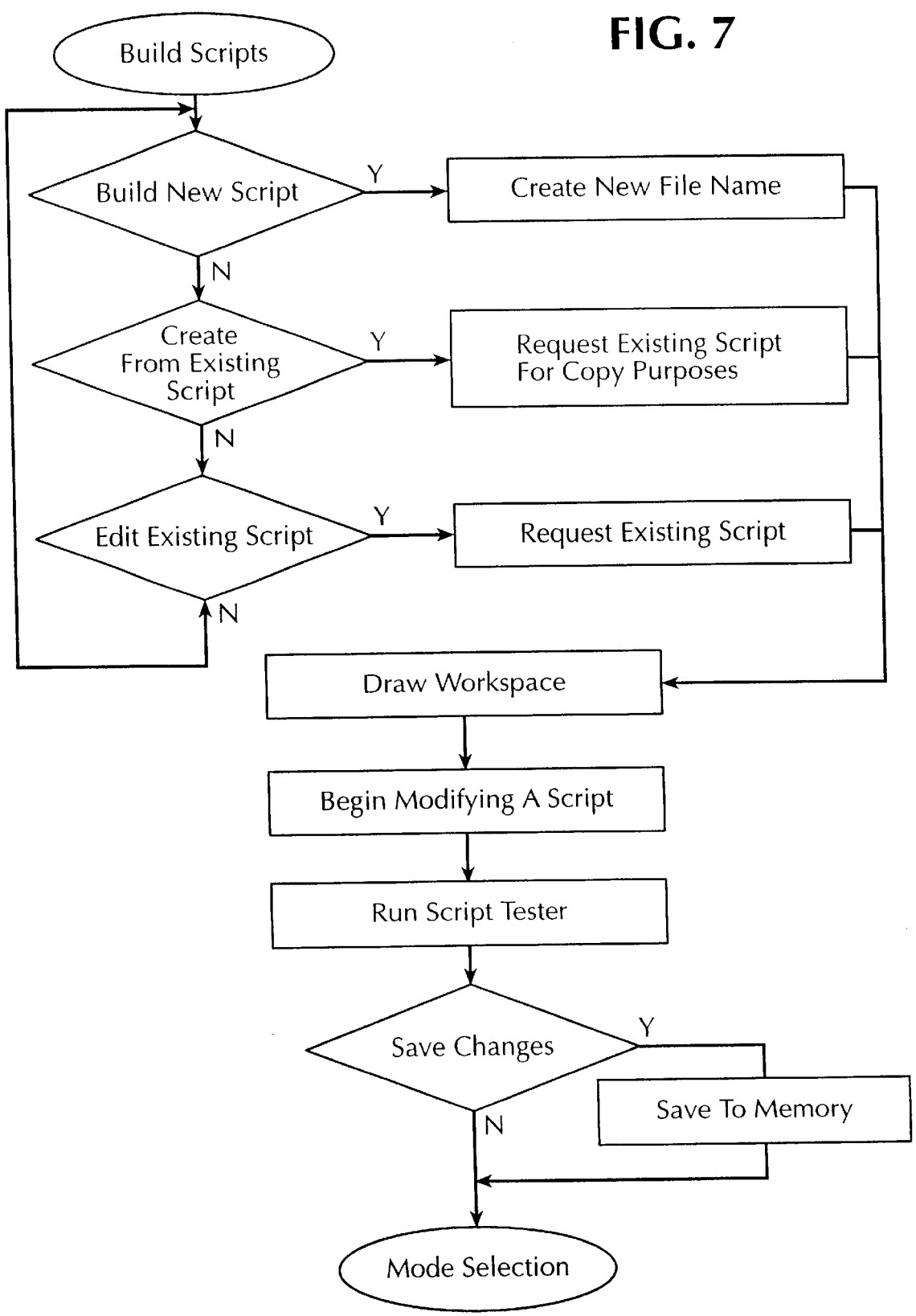
Figure 8:
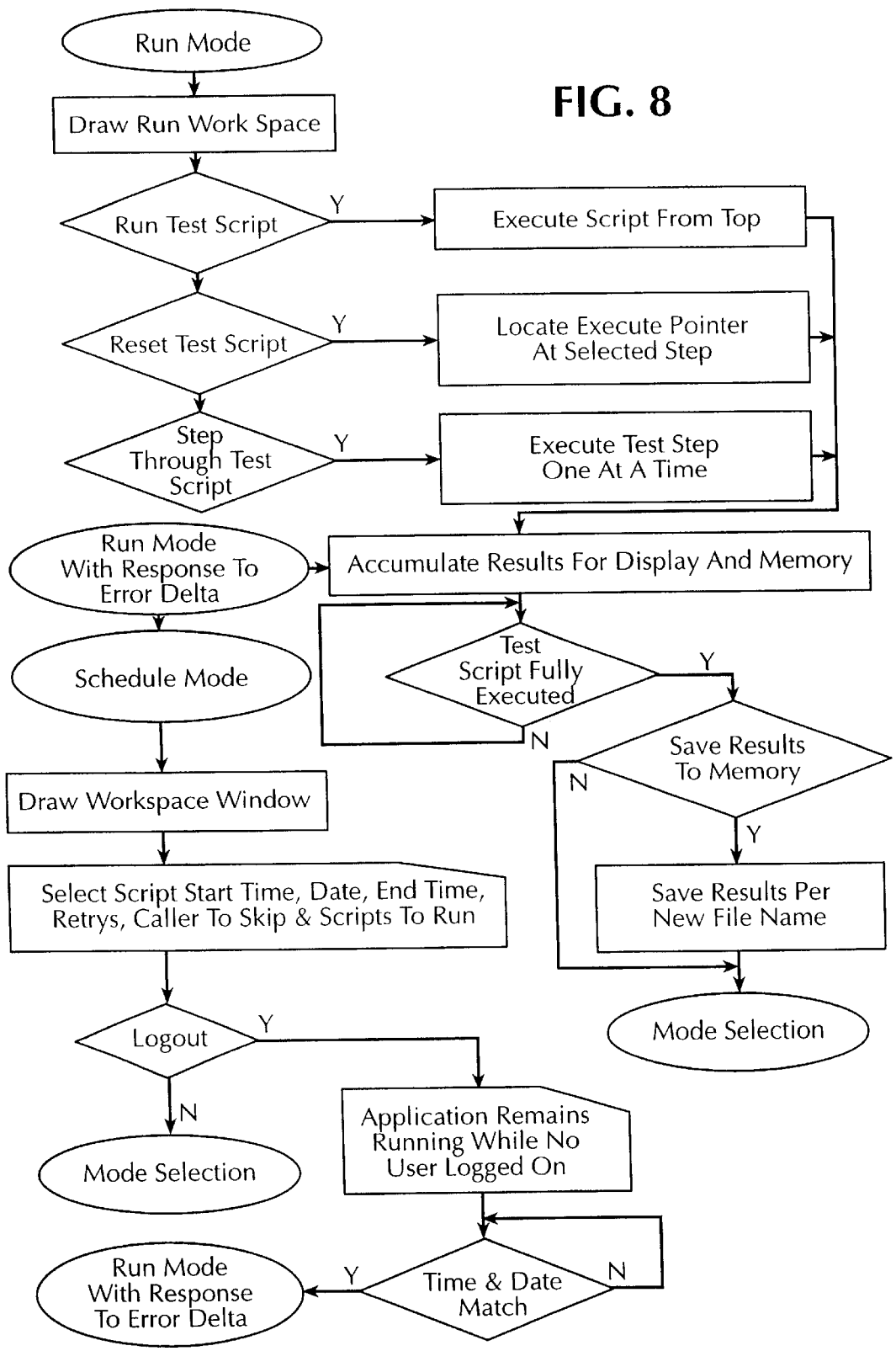
Figure 10:
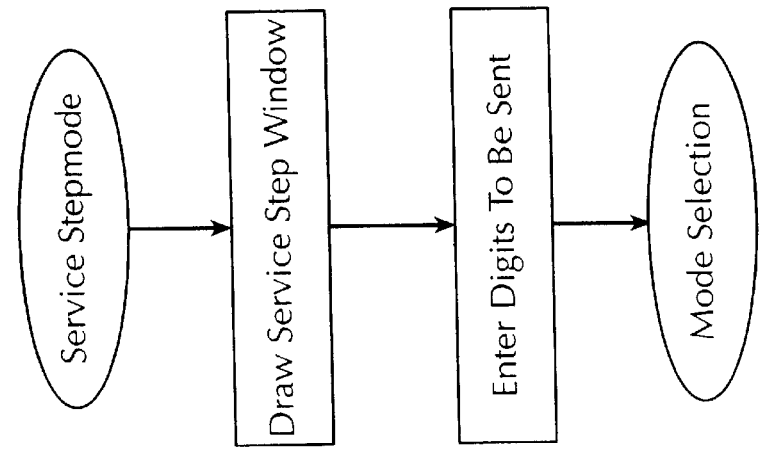
Figure 9:
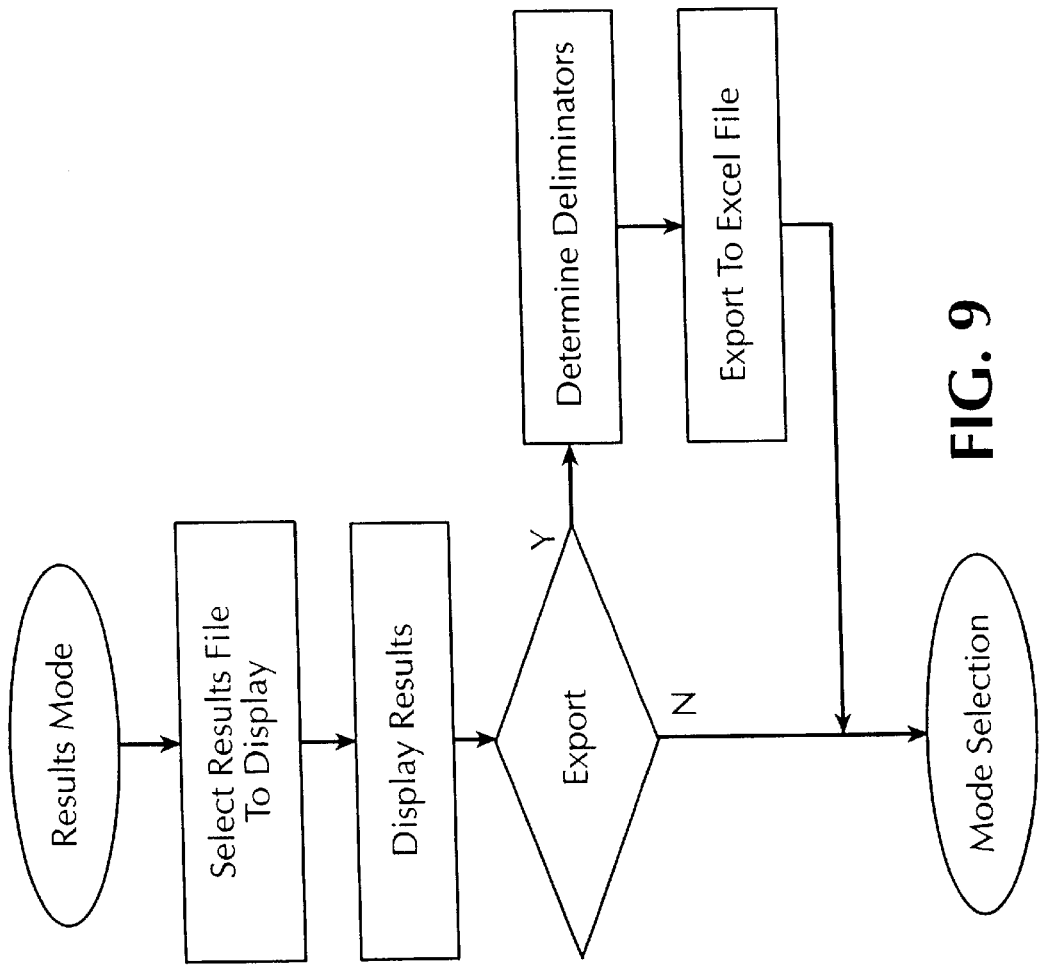

FIGS. 4–13 are flow charts illustrating the general functions of the software that resides in the controller 110. FIG. 4 illustrates the various mode options available to a user of the system and FIGS. 5–13 illustrate the flow diagrams of each of the individual modes. As stated above, the controller 110 in the preferred embodiment is comprised of a standard personal computer running the Microsoft Windows NT operating system. The controller functionality includes a methodology for managing calls (placing and receiving calls and sending and returning audio) in remote areas using one or more RCPs. The basic modes of the controller functionality are as follows: administration mode, login mode, buildingscripts mode, Run Mode, scheduled mode, results mode, interactive mode, maintenance mode, help mode and service step mode.

Administration mode includes a process of allocating user names and selecting passwords. By way of the main user or administrator, users will be assigned and passwords determined. Through a tiered authorization system each user will be assigned an authorization level providing varying access to controller functionality. These access levels are identified as level one, two, and three.

Login mode provides entry into the system by requesting a password from the user. It also may demand that the user, for further security, change his password after every three entries into the system.

The Build scripts mode allows for the building of test calls on the controller by way of the application specific software provided thereby offering the user an implicit method of creating most types of calls that can be presently made by wireless and landline subscribers today. These test calls are built by listing each of presently 12 commands in the order required to place a call as needed. These commands are further enhanced by additional user entries to select phones and mobile numbers to be used, selection of audio direction and RCP to be used, decision to record audio and for how long, whether or not to answer the terminating mobile, and others. As a part of this mode, the test calls can be tested for accuracy by selecting a call test function that will verify the proper coding of the new test call. Additionally, key words and functions within a test call can be modified automatically through a string search and replace command.

In the run mode, the test calls built in the build scripts mode are executed. In the run mode, each of the commands or test steps in the list are executed in sequence thereby allowing the test call to be managed by the appropriate RCP/s. In the scheduled mode, the test calls are executed according to a predetermined schedule. In either mode the test calls are performed identically. However, responses to some of the stimulus from the wireless network may be responded to differently between the two different modes. In run mode an error in placing a call is responded to by stopping the call execution and asking for user intervention. In scheduled mode the same error is noted and the very next test call is executed and the process continues. In scheduled mode additional structure is added to allow the user to place a time delay between each test call, eliminate predetermined phone numbers from being dialed, determine the numbers of times an erred call must be retried upon completion of the first full list completed, and stop the list of calls from being executed prematurely.

At the completion of all executed test calls the results of all test steps executed whether erred or not are stored in the controller's memory. The controller, in order to determine the performance of each call, parses the results. This performance rating is coded and stored with the results within the controller's memory. This storage includes all one way and two way audio messages received by the controller from the selected RCPs. These results are stored in a standard format so that any standard PC can read or further analyze them.

In the results mode, the user can display, analyze and manipulate the results of the test calls. In the interactive mode, the user can activate and use the feature allowing audio to be sent from the controller to the RCPs.

In system information mode the user is provided information about key aspect of the operating system status such as; Software and Hardware revision levels, display resolution, time and date. In the maintenance mode, the user may copy stored test call lists and result files to other areas in memory.

In the configure RCP mode the controller provides a means of configuring each RCP in the system and the inherent devices within each RCP. Here the RCP can be named, the cellular phones are configured for their new mobile numbers (NAMs), the cellular phones ESN can be read and the landline number can be inserted. RCPs can be added or deleted in this mode and the associated IP addresses for each RCP can be programmed into the RCP.

Service step mode provides the user an opportunity to create program steps to insert digits and delay between digits into a phone in a RCP. These can be created and named, to be drawn from the standard list of program steps provided in the build scripts mode.

While a preferred embodiment of the invention has been disclosed in detail, the invention is not to be limited thereby, but only by the following claims.

What is claimed is:

1. A telephone switch testing system for testing the operation of telephone switches that serve a plurality of calling areas, the telephone switch testing system comprising:
   a test controller programmable to run tests against one or more telephone switches; and
   a plurality of remote test units connected to and controlled by the test controller through respective communication links, each remote test unit serving a calling area and including:
   a telephone; and
   a processor connected to the telephone and being in communication with the test controller through the respective communication link, the processor being operable to establish a telephone connection to a destination device through a calling area telephone switch, receive audio data from the destination device through the established telephone connection, and transmit the received audio data to the test controller through the respective communication link in order to test the calling area telephone switch.

2. The telephone switch testing system according to claim 1 wherein at least one remote test unit includes a first telephone and a second telephone both connected to the processor, wherein upon prompting by the test controller, the at least one remote test unit establishes a telephone connection from the first telephone through the calling area telephone switch to the second telephone.

3. The telephone switch testing system according to claim 1 wherein the test controller is programmed to execute test calls according to a predetermined schedule.

4. The telephone switch testing system according to claim 3 wherein at least a portion of the communication link uses the Internet.

5. A telephone switch testing system for testing the operation of telephone switches that serve a plurality of calling areas, the telephone switch testing system comprising:
   a test controller programmable to run tests against one or more telephone switches; and
   a plurality of remote test units connected to and controlled by the test controller through respective communication links, each remote test unit serving a calling area and including:
   a telephone; and
   a processor connected to the telephone and being in communication with the test controller through the respective communication link, the processor being operable to establish a telephone connection to a destination device through a calling area telephone switch, receive audio data from the destination device through the established telephone connection, and transmit the received audio data to the test controller through the respective communication link in order to test the calling area telephone switch,
   wherein at least one remote test unit includes a first telephone and a second telephone both connected to the processor, wherein upon prompting by the test controller, the at least one remote test unit establishes a telephone connection from the first telephone through the calling area telephone switch to the second telephone,
   and wherein a tone generated by the test controller travels through the respective communication link, through the first telephone, through the calling area telephone switch, through the second telephone, through the respective communication link again and back to the test controller.

6. A telephone switch testing system for testing the operation of telephone switches that serve a plurality of calling areas, the telephone switch testing system comprising:
   a test controller programmable to run tests against one or more telephone switches; and
   a plurality of remote test units connected to and controlled by the test controller through respective communication links, each remote test unit serving a calling area and including:
   a telephone; and
   a processor connected to the telephone and being in communication with the test controller through the respective communication link, the processor being operable to establish a telephone connection to a destination device through a calling area telephone switch, receive audio data from the destination device through the established telephone connection, and transmit the received audio data to the test controller through the respective communication link in order to test the calling area telephone switch,
   wherein:
   the plurality of remote test units includes first and second remote test units respectively connected to the test controller through a first communication link and a second communication link; and
   upon prompting by the test controller through the first communication link, the first remote test unit establishes a telephone connection from the first remote test unit through the calling area telephone switch to the second remote test unit.

7. The telephone switch testing system according to claim 6 wherein a tone generated by the test controller travels through the first communication link, through the first remote test unit, through the calling area telephone switch, through the second remote test unit, and through the second communication link back to the test controller.

8. The telephone switch testing system according to claim 6 wherein when the first remote test unit establishes the telephone connection to the second remote test unit, the second remote test unit sends the audio data to the test controller through the second communication link.

9. A telephone switch testing system for testing the operation of telephone switches that serve a plurality of calling areas, the telephone switch testing system comprising:
- a test controller programmable to run tests against one or more telephone switches; and
- a plurality of remote test units connected to and controlled by the test controller through respective communication links, each remote test unit serving a calling area and including:
  - a telephone; and
  - a processor connected to the telephone and being in communication with the test controller through the respective communication link, the processor being operable to establish a telephone connection to a destination device through a calling area telephone switch, receive audio data from the destination device through the established telephone connection, and transmit the received audio data to the test controller through the respective communication link in order to test the calling area telephone switch,
- wherein the test controller is operable to provide identity information to at least one of the telephones of the remote test units by configuring a NAM and an ESN of the telephones of the remote test units through the respective communication links.

10. A telephone switch testing system for testing the operation of telephone switches that serve a plurality of calling areas, the telephone switch testing system comprising:
- a test controller programmable by a tester to run tests against one or more telephone switches; and
- a plurality of remote test units connected to and controlled by the test controller through a communication link, each remote test unit serving a calling area and including:
  - a telephone; and
  - a processor connected to the telephone and being in communication with the test controller through the communication link, the processor being operable to:
    - establish a telephone connection to a destination device through a calling area telephone switch when prompted by the test controller through the communication link, and
    - receive telecommunications data from the destination device through the established telephone connection and communicate the data regarding the received telecommunications data to the test controller through the communication link, the path of the established telephone connection being different from the communications link.

11. The telephone switch testing system according to claim 10 wherein the data regarding the received telecommunications data include an audio signal from the destination device and the received audio signal is routed to the test controller through the communication link.

12. The telephone switch testing system according to claim 10 wherein the data regarding the received telecommunications data include a non-audio indication that the telephone connection has been successfully established and the non-audio indication is routed to the test controller through the communication link.

13. The telephone switch testing system according to claim 10 wherein at least one remote test unit includes a first telephone and a second telephone both connected to the processor, wherein upon prompting by the test controller, the at least one remote test unit establishes a telephone connection from the first telephone through the calling area telephone switch to the second telephone.

14. The telephone switch testing system according to claim 10 wherein the test controller is programmed to execute test calls according to a predetermined schedule.

15. The telephone switch testing system according to claim 10 wherein at least a portion of the communication link uses the Internet.

16. A telephone switch testing system for testing the operation of telephone switches that serve a plurality of calling areas, the telephone switch testing system comprising:
- a test controller programmable by a tester to run tests against one or more telephone switches; and
- a plurality of remote test units connected to and controlled by the test controller through a communication link, each remote test unit serving a calling area and including:
  - a telephone; and
  - a processor connected to the telephone and being in communication with the test controller through the communication link, the processor being operable to:
    - establish a telephone connection to a destination device through a calling area telephone switch when prompted by the test controller through the communication link, and
    - receive telecommunications data from the destination device through the established telephone connection and communicate the data regarding the received telecommunications data to the test controller through the communication link, the path of the established telephone connection being different from the communications link,
- wherein at least one remote test unit includes a first telephone and a second telephone both connected to the processor, wherein upon prompting by the test controller, the at least one remote test unit establishes a telephone connection from the first telephone through the calling area telephone switch to the second telephone,
- and wherein a tone generated by the test controller travels through the communication link, through the first telephone, through the calling area telephone switch, through the second telephone, through the communication link again and back to the test controller.

17. A telephone switch testing system for testing the operation of telephone switches that serve a plurality of calling areas, the telephone switch testing system comprising:
- a test controller programmable by a tester to run tests against one or more telephone switches; and
- a plurality of remote test units connected to and controlled by the test controller through a communication link, each remote test unit serving a calling area and including:
  - a telephone; and
  - a processor connected to the telephone and being in communication with the test controller through the communication link, the processor being operable to:

establish a telephone connection to a destination device through a calling area telephone switch when prompted by the test controller through the communication link, and receive telecommunications data from the destination device through the established telephone connection and communicate the data regarding the received telecommunications data to the test controller through the communication link, the path of the established telephone connection being different from the communications link, wherein:

the plurality of remote test units includes first and second remote test units respectively connected to the test controller through a first communication link and a second communication link; and upon prompting by the test controller through the first communication link, the first remote test unit establishes a telephone connection from the first remote test unit through the calling area telephone switch to the second remote test unit.

18. The telephone switch testing system according to claim 17 wherein a tone generated by the test controller travels through the first communication link, through the first remote test unit, through the calling area telephone switch, through the second remote test unit, and through the second communication link back to the test controller.

19. The telephone switch testing system according to claim 17 wherein when the first remote test unit establishes the telephone connection to the second remote test unit, the second remote test unit sends the telecommunications data to the test controller through the second communication link.

20. A telephone testing system for testing the operation of telephone switches that serve a plurality of calling areas, the telephone switch testing system comprising:

a test controller programmable by a tester to run tests against one or more telephone switches; and a plurality of remote test units connected to and controlled by the test controller through a communication link, each remote test unit serving a calling area and including:

a telephone; and a processor connected to the telephone and being in communication with the test controller through the communication link, the processor being operable to:

establish a telephone connection to a destination device through a calling area telephone switch when prompted by the test controller through the communication link, and receive telecommunications data from the destination device through the established telephone connection and communicate the data regarding the received telecommunications data to the test controller through the communication link, the path of the established telephone connection being different from the communications link, wherein the test controller is operable to provide identity information to at least one of the telephones of the remote test units by configuring a—NAM and an ESN of the telephones of the remote test units through the respective communication links.

21. A telephone switch testing system for testing the operation of telephone switches that serve a plurality of calling areas, the telephone switch testing system comprising:

a test controller programmable to run tests against one or more telephone switches; and a plurality of remote test units connected to and controlled by the test controller through respective communication links, each remote test unit serving a calling area and including:

a telephone; and a processor connected to the telephone and being in communication with the test controller through the respective communication link, the processor being operable to establish a telephone connection to a destination device through a calling area telephone switch, receive audio data from the destination device through the established telephone connection, and transmit the received audio data to the test controller through the respective communication link in order to test the calling area telephone switch, and, wherein the test controller is operable to provide identity information to at least one of the telephones of the remote test units.

22. The telephone switch testing system according to claim 21 wherein the test controller is operable to provide identity information to at least one of the telephones of the remote test units by providing a subscriber identifier.

23. The telephone switch testing system according to claim 21 wherein the test controller is operable to provide identity information to at least one of the telephones of the remote test units by providing a subscriber identifier in the form of a mobile identification number (MIN).

24. A telephone switch testing system for testing the operation of telephone switches that serve a plurality of calling areas, the telephone switch testing system comprising:

a test controller programmable by a tester to run tests against one or more telephone switches; and a plurality of remote test units connected to and controlled by the test controller through a communication link, each remote test unit serving a calling area and including:

a telephone; and a processor connected to the telephone and being in communication with the test controller through the communication link, the processor being operable to:

establish a telephone connection to a destination device through a calling area telephone switch when prompted by the test controller through the communication link, and receive telecommunications data from the destination device through the established telephone connection and communicate the data regarding the received telecommunications data to the test controller through the communication link, the path of the established telephone connection being different from the communications link, wherein the test controller is operable to provide identity information to at least one of the telephones of the remote test units.

25. The telephone switch testing system according to claim 24 wherein the test controller is operable to provide identity information to at least one of the telephones of the remote test units by providing a subscriber identifier.

26. The telephone switch testing system according to claim 24 wherein the test controller is operable to provide identity information to at least one of the telephones of the remote test units by providing a subscriber identifier in the form of a mobile identification number (MIN).

* * * * *